United States Patent Office 3,523,049
Patented Aug. 4, 1970

3,523,049
PROCESS FOR HIGH-FREQUENCY BONDING OF WOOD SECTIONS HAVING IMPREGNATED PRESERVATIVE
Randolph B. Putman, Pittsburgh, Pa., assignor to Koppers Company, Inc., a corporation of Delaware
No Drawing. Filed Dec. 12, 1967, Ser. No. 689,796
Int. Cl. B29c 19/04
U.S. Cl. 156—273   5 Claims

ABSTRACT OF THE DISCLOSURE

Laminated wood products are produced which contain a preservative that renders the wood resistant to attack by bacteria, fungi, and termites, by a process in which the wood product is bonded by high-frequency curing of an adhesive. The high-frequency curing of preserved wood products is made possible by the use of a non-electrolyte containing chromated copper arsenate solution, the solution acting as a preservative in the finished wood product without interfering with the high-frequency adhesive cure.

BACKGROUND OF THE INVENTION

It is known that chromated copper arsenate solutions are excellent preservatives for prevention of decay and deterioration of wood. Wood impregnated with these solutions is resistant to decay and attack by termites while, at the same time, the active ingredients are resistant to weathering and leaching when the wood is in contact with the ground or water, and the treated wood is adapted for reception of surface coatings such as paint.

Such solutions are generally prepared by forming an aqueous solution of copper sulfate, arsenic pentoxide and potassium dichromate in desirable proportions, as illustrated in U.S. Pat. 2,106,978 to Sonti Kamesam.

Wood products have been prepared from chromated copper arsenate treated wood sections by laminating such treated wood sections with adhesives that cure chemically or by the application of heat to the wood.

With the advent of high-frequency curing methods for adhesives used in bonding of wood, such as that described in U.S. 3,232,811, attempts have been made to cure adhesive coated wood treated with chromated copper arsenate solutions by high-frequency curing. However, it was found that wood treated with chromated copper arsenate solutions could not be used in processes where wood sections were to be laminated by high-frequency adhesive curing because of shorts, arcing, poor glue set and other problems.

SUMMARY OF THE INVENTION

According to the present invention, high-frequency cured adhesive bonded wood products containing a chromated copper arsenate preservative are produced by impregnating the individual wood sections used in the laminate with an aqueous preservative solution consisting of non-electrolytic inorganic chromic, arsenic, and cupric compounds. The treated wood sections are then dried to a moisture content of less than about 12% by weight, adhesive applied to individual wood sections and a plurality of the wood sections fed, in mating relationship, into a high-frequency adhesive curing apparatus, whereby the adhesive is heated and cured to produce a laminated wood product resistant to decay and termite attack.

DETAILED DESCRIPTION

The composition of the preservation solution used to impregnate the wood members is critical. In order to prevent interference with the high-frequency curing of the adhesive coated wood members during the curing of the adhesive, the preservative solution used to impregnate the wood members must be devoid of electrolytes. The term electrolytes as used herein signifies salt forming ions such as sodium or potassium ions and the like which are normally present in preservative solutions.

The preservative consists essentially of copper, chromium and arsenic compound in oxide form. The copper compound is copper oxide, or copper carbonate compounds which will decompose to copper oxide compounds on evolution of carbon dioxide. The chromium compound used in the present invention is chromic acid, and the arsenic compound is arsenic acid or arsenic pentoxide. The term oxide as used hereinabove signifies a compound having no electrolytes or ions which would interfere with transfer of an electric current, and includes compounds in classic oxide form and also those containing hydrogen in some amount, such as with arsenic pentoxide.

The amounts of the various non-electrolyte containing copper, chromium and arsenate compounds should be that amount necessary to provide adequate protection against termite, fungi and other attack. The amounts of the various compounds of the preservative fall generally within the range of 17–21% copper oxide calculated as CuO; 32–67% chromic acid, hexavalent chromium calculated as $CrO_3$; and 15–50% arsenic acid, pentavalent arsenic compound calculated as total $As_2O_5$.

An especially useful composition is that which is a standard of The American Wood Preserver's Association under the title Wolman CCA Type B, and is discussed in the article by W. T. Henry and E. B. Jeroski, "Relationship of Arsenic Concentration to the Leachability of Chromated Copper Arsenate Formulations," American Wood-Preserver's Association, 1967.

The aqueous preservative solution generally contains about 1–3% of preservative. This concentration enables ready solution of the non-electrolytic cupric, chromic and arsenic compounds and ready impregnation of the wood members therewith. Stronger concentrations may, of course, be used, but concentrations of 1–3% are commercially desired.

The wood is impregnated conveniently by the "full cell" cycle. The object of the full cell process is to fill the capillary structure of the wood with the treating solution. This is accomplished by subjecting the treating reactor, containing the wood to be treated therein, to a vacuum of about 22–26 inches of mercury for a period of time ranging from 15 minutes to an hour. The reactor is then filled with the treating solution and subjected to a pressure of about 125 to 200 p.s.i. at 25 to 100° C. for about 2 to 8 hours. The larger and more refractory pieces of wood require either a longer vacuum period or longer pressure period, or perhaps both. For most woods, a 30- minute vacuum at 25 to 26 inches mercury followed by a 4 to 8-hour pressure period of 160 p.s.i. at 50 to 60° C. is adequate.

Other standard impregnation techniques known to the art can also be used, depending, of course, on the physical nature of the wood. For example, impregnation may be accomplished by soaking, by vacuum impregnation at atmospheric pressure, by alternate application of pressure and vacuum or by the "empty cell" process. The empty cell process involves forcing the impregnated solution under pressure into wood containing air. The back pressure, caused by compressing the air within the wood, forces out part of the solution when the pressure is released.

In general, the amount of preservative retained in the wood to give adequate protection will be in the order of 0.25–0.75 pound per cubic foot. The amount needed will vary depending on the species of wood used and also the end use of the preserved wood. Retention in excess of 0.75 p.c.f. can be used where special or severe exposure conditions are contemplated.

After the impregnation treatment, the wood is placed in a drying oven of kiln to dry the treated wood. Wood is dried in a conventional manner to a moisture content of less than about 12 percent. The temperature and drying conditions used are those conventionally used. As is known, the temperatures used in the drying operations will vary depending upon the species of wood and the moisture content desired. The temperatures usable for some woods will range up to about 100° C., while generally lower temperatures are used for most woods. Thus, temperatures in the order of about 40 to 100° C. are usable, depending upon the wood, with temperatures in the order of about 40–70° C. being generally desired. The drying is advantageously carried out in commercial drying kilns under known conditions for the particular wood being used, care being taken not to affect the wood itself by adverse temperatures.

Following the impregnation of the wood members with a non-electrolyte containing copper chromium arsenate preservative composition and drying of the wood to less than about 12% moisture, the individual wood members are then trimmed or surfaced so as to give closely fitting mating sides. The mating sides of the individual wood members have then applied thereto a suitable wood adhesive. Either one or both of a pair of mating sides may have adhesive applied. Suitable adhesives are those well known as wood bonding adhesives, such as the resin based adhesives, including the phenol-resorcinol-formaldehyde, phenol-formaldehyde, urea-formaldehyde, and melamine-formaldehyde adhesives.

After application of adhesive to mating sides of the impregnated wood members, a plurality of such members are fed in mating relationship to a suitable high-frequency curing apparatus, and the adhesive cured by high-frequency electric current heating. In such curing, a high-frequency electric current is directed parallel to the adhesive line and heats the resin to cure the adhesive and bond the wood members. Because the adhesive layers have a higher conductivity than the wood, the current is concentrated in the adhesive layers and the resulting heat cures the adhesive. A suitable type of high-frequency adhesive curing apparatus is that manufactured and marketed by Mann-Russell Electronics, of Tacoma, Wash. The adhesive is cured by the heat resulting from the high-frequency charge and the individual, wood members bonded together to form a preserved wood laminated product.

The invention is further illustrated by the following examples.

Example I

A plurality of boards or individual wood members were impregnated with an aqueous solution containing 18% by weight copper oxide (CuO), 65% by weight chromic acid ($CrO_3$), and 17% by weight arsenic acid ($As_2O_5$). The retention was determined to be about 0.6 pound per cubic foot. The wood members were dried to less than about a 10% moisture content and then freshly trimmed so as to give smooth mating surfaces. To the mating surface of individual treated board members, there was applied a commercially available melamine-formaldehyde adhesive, the board members brought into mating relationship and fed into a high-frequency adhesive curing apparatus. The treated, mated, adhesively coated boards were cured in the high-frequency curing apparatus as is conventional adhesive coated lumber. The high-frequency adhesive cured bonded wood product showed very little checking and no wood collapse or arcing occurred during the adhesive cure. The laminated wood product showed good bond strength and is resistant to termite and fungi attack.

Example II

Another experiment was made on a small scale. Boards of southern yellow pine were treated with an aqueous preservative solution generally corresponding to that used in Example I.

The boards were treated to an average retention of 0.60 lb./cu. ft. and then dried to 7.0–8.5 percent moisture content. The boards were then freshly surfaced. Six-ply laminated billets were prepared using a commercially available phenol-resorcinol adhesive, the adhesive being cured using a 5 kw. R.F. generator. No arcing occurred during the cure. Compression shear specimens were cut from the beam and tested within two hours after bonding. Shear strength of five specimens averaged greater than 1400 p.s.i. and wood failure grater than 90 percent.

Example III

The procedure of Example I was repeated except that the impregnating solution used was an aqueous solution containing, as preservative, 56% potassium dichromate ($K_2Cr_2O_7$), 33% copper sulfate ($CuSO_4 \cdot 5H_2O$) and 11% arsenic pentoxide ($As_2O_5 \cdot 2H_2O$). The attempted high-frequency curing resulted in severe checking of the laminated wood product. The product showed poor results on a delamination test and was wholly unacceptable for use. This evidences the critical nature of the chronic copper arsenate solution used in the process of the invention.

There has been described a method of preparing chromated copper arsenate preserved laminated wood members, such preserved members being heretofore unobtainable by high-frequency curing procedures. The use of the specific non-electrolytic chromic, cupric and arsenic inorganic compounds allows the use of high-frequency curing and results in the production of laminated wood products resistant to attack by bacteria, fungi, and termites.

What is claimed is:

1. Process for the preparation of high-frequency bonded laminated wood products which are resistant to attack by bacteria, fungi, and termites, comprising:
    (a) impregnating individual wood sections with an aqueous preservative solution consisting of nonelectrolytic inorganic chromic, arsenic, and cupric compounds;
    (b) drying said individual wood sections to a water content of less than about 12% by weight of water;
    (c) applying a formaldehyde type, resin based adhesive to at least one of a pair of mating surfaces of said individual wood sections;
    (d) arranging a plurality of said wood sections with their mating surfaces in a mating relationship so that said adhesive is disposed between said mating surfaces; and
    (e) subjecting said individual wood sections thus arranged to high-frequency electric current to heat and cure said adhesive and produce a laminated wood product.

2. The process of claim 1 wherein said preservative consists of chromic acid, arsenic acid and copper oxide.

3. The process of claim 2 wherein said chromic acid is present as $CrO_3$ in 32–67% by weight, said arsenic acid is present as $As_2O_5$ in 15–50% by weight and said copper oxide is present as CuO in 17–21% by weight of said preservative.

4. The process of claim 3 wherein said preservative is present as a 1–3% aqueous solution.

5. The process of claim 1 wherein said drying is to a water content of less than 10% by weight.

References Cited

UNITED STATES PATENTS

| | | | |
|---|---|---|---|
| 2,089,644 | 8/1937 | Samsonow | 156—281 X |
| 2,303,916 | 12/1942 | Samsonow | 156—281 |
| 2,412,534 | 12/1946 | Randall | 156—281 |
| 2,418,233 | 4/1947 | McClary | 156—281 |
| 2,449,785 | 9/1948 | Lippman et al. | |
| 2,453,679 | 11/1948 | Stamm et al. | 156—281 X |
| 2,563,821 | 8/1951 | Denig et al. | 156—281 X |
| 2,917,408 | 12/1959 | Goldstein et al. | 156—281 |
| 3,137,607 | 6/1964 | Goldstein et al. | 156—281 |
| 3,232,811 | 2/1966 | Coulter et al. | 156—273 |

CARL D. QUARFORTH, Primary Examiner

S. J. LECHERT, Jr., Assistant Examiner

U.S. Cl. X.R.

21—7; 106—15; 117—147; 156—278, 281, 304, 331, 335; 161—268, 270; 252—385, 397